Patented Jan. 9, 1945

2,367,078

UNITED STATES PATENT OFFICE 2,367,078

PROCESS FOR THE PRODUCTION OF SATURATED KETONES

Charles Weizmann, New York, N. Y.

No Drawing. Application July 7, 1943,
Serial No. 493,705

2 Claims. (Cl. 260—593)

This invention relates to improvements in processes for the production of saturated ketones from α, β-unsaturated ketones, and particularly for the selective hydrogenation of the carbon-carbon-double bond in α, β-unsaturated ketones, the main object of the invention being to provide a practical and effective method of reducing the unsaturated ketones to form saturated ketones.

Many interesting applications have recently been found for saturated higher molecular ketones, such for example as starting materials for chemical syntheses and as components of high-octane fuel because of their unusually high octane number.

The production of such ketones from the corresponding α, β-unsaturated ketones is, however, not easy as it is not always simple to stop the reaction after hydrogenation of the carbon-carbon-double bond only, without affecting the carbonyl group. Such α, β-unsaturated ketones are known to be easily available by condensation of aldehydes with ketones or by self-condensation of ketones as for example, described in my co-pending applications Serial Nos. 464,788 and 464,789, of which the present application is a continuation in part. I have now found that the unsaturated ketones thus obtained may advantageously be reduced to form saturated ketones by means of hydrogen, using as catalyst Raney nickel and carrying out the hydrogenation under neutral or acid conditions. In a slightly acidic medium, the rate of hydrogen absorption decreases practically to zero, when the C=C— double bond is saturated, and no attack on the carbonyl group is to be feared. The acidity of the medium can be created by addition of small amounts of organic acids, or preferably by addition of hydrohalides of tertiary amines. According to the invention the reaction can be advantageously carried out at ordinary temperature and pressure though increased pressure and temperature may be used if desired. In many cases no diluent is required, and in some cases only a small quantity of diluent is used.

The following examples are illustrative of the manner in which the invention may be carried out, but it is to be understood that the invention is by no means limited to the details given therein:

Example I.—98 grams of mesityl oxide were hydrogenated after addition of 2 cubic centimeters glacial acetic acid, under ordinary pressure and at room temperature, in the presence of 1 gram of freshly prepared Raney nickel. The absorption of the theoretical quantity of hydrogen lasted two hours. The supernatant liquid was neutralized with solid sodium carbonate and distilled. A theoretical yield of methyl-isobutyl-ketone, boiling point 116° C. was obtained.

Example II.—Hydrogen is passed into a mixture of 126 grams of 3.4-dimethyl-3- hexene-2-one with 0.5 gram trimethylamine hydrochloride and 50 grams of alcohol in the presence of 2 grams of Raney nickel. After the absorption of 1 molecule of hydrogen, the reaction came to a standstill. The filtered solution was distilled in a very efficient column as the saturated ketone tends to distill with alcohol vapours. The product obtained in quantitative yield is 3.4-dimethyl-2-hexanone, boiling point 158–159.

Having thus described my invention, what I claim and desire to secure by Letters Patent is:

1. The process for the selective hydrogenation of the carbon-carbon-double bond in α, β-unsaturated ketones, which consists in carrynig out the reaction in the presence of Raney nickel as catalyst in a medium having a pH value below 7.5.

2. The process for the selective hydrogenation of the carbon-carbon-double bond in α, β-unsaturated ketones, which consists in carrying out the reaction in the presence of Raney nickel as catalyst in a medium of which the pH value is maintained slightly on the acid side by adding to the reaction mixture a salt which is a member of the group consisting of the hydrochlorides and hydrobromides of tertiary amines, dissolved in a small quantity of an alcohol.

CHARLES WEIZMANN.